United States Patent [19]
Suzuki

[11] Patent Number: 5,921,877
[45] Date of Patent: Jul. 13, 1999

[54] TOOTH PROFILE FOR ROLLER CHAIN SPROCKET

[75] Inventor: Tadasu Suzuki, Higashimurayama, Japan

[73] Assignee: Tsubakimoto Chain Co., Osaka, Japan

[21] Appl. No.: 08/890,605

[22] Filed: Jul. 9, 1997

[30] Foreign Application Priority Data

Jul. 9, 1996 [JP] Japan ..................... 8-179292

[51] Int. Cl.$^6$ ..................................................... F16H 7/06
[52] U.S. Cl. ............................................. 474/156; 474/157
[58] Field of Search ..................................... 474/156, 206, 474/213, 214, 212, 216, 217, 152, 155, 157, 158

[56] References Cited

U.S. PATENT DOCUMENTS

| | | | |
|---|---|---|---|
| 2,725,755 | 11/1955 | Riopelle .................................. | 474/157 |
| 4,036,071 | 7/1977 | McKnight et al. ..................... | 474/156 |
| 4,099,424 | 7/1978 | Pemberton .............................. | 474/156 |
| 4,116,081 | 9/1978 | Luttrell et al. ........................... | 474/156 |

FOREIGN PATENT DOCUMENTS 5-231500 9/1993 Japan .

*Primary Examiner*—John A. Jeffery
*Assistant Examiner*—Marcus Charles
*Attorney, Agent, or Firm*—Armstrong, Westerman, Hattori, McLeland and Naughton

[57] ABSTRACT

A tooth profile for a roller chain sprocket, is provided, which is capable of making the rollers of a chain come into engagement with the teeth of the roller chain sprocket without generating a large noise, and which is capable of making the rollers disengage smoothly from the teeth of the roller chain sprocket. The tooth profile has a first section between a first working point on a clearance flank on the back side with respect to the direction of a movement chain and the tip of a tooth, having a circular profile conforming to a moving path along which the outer circumference of a succeeding roller turns about the center of a preceding roller. The tooth profile has a second section between the first working point to the bottom of the tooth, which is continuous with the first section having a circular profile conforming to the outer circumference of the roller. The tooth profiles a third section between a second working point on a working flank on the forward side with respect to the moving direction of the chain and the tip of the tooth. The third section has a profile which will not interfere with a circular moving path along which the outer circumference of the roller turns about the center of a succeeding roller when disengaging from the sprocket.

1 Claim, 3 Drawing Sheets

TOOTH PROFILE FOR ROLLER CHAIN SPROCKET

TECHNICAL FIELD OF THE INVENTION

The present invention relates to a tooth profile for a roller chain sprocket.

DESCRIPTION OF THE RELATED ART

Roller chain sprockets have teeth of tooth profiles as specified in International Standards Organization (ISO) and Japanese Industrial Standards (JIS). As shown in FIG. 2, a tooth bottom 10A of a sprocket 10 conforming to the ISO and JIS standards has a profile conforming to the outline of a roller 12 of a chain 11.

When a roller 12 comes into engagement with a tooth of the sprocket 10 having a tooth profile as described above, link plates 13 of the chain 11 turn about the center O of a preceding roller 12A which has previously come into engagement with a tooth of the sprocket 10 as the sprocket 10 rotates, and the roller 12 strikes against a tooth bottom 10A to generate a large noise.

The applicant of the present patent application has previously proposed a roller chain sprocket 20 as shown in FIG. 3, which is capable of reducing noise that is generated upon the engagement of the roller of a chain with a tooth of the roller chain sprocket in JP-U No. 7-6554. As shown in FIG. 3, the tooth flank of each of the teeth of the sprocket 20 has a first circular curved surface 20A coinciding with the moving path of the outer circumference of a roller 21 which turns about the center O of a preceding roller 21A connected to the roller 21 by link plates 22, extending from a working point T on the tooth flank where the roller 21 engages the tooth to the tip of the tooth, and a curved surface continuous with the first curved surface 20A, extending from the working point T to the root of the tooth, and formed so that the roller 21 does not come into contact therewith.

The tooth profile of the teeth of the sprocket 20 disclosed in JP-U No. 7-6554 reduces shocks exerted on the sprocket by the roller 21 when the roller 21 engages the tooth flank of a tooth of the sprocket 20 and reduces noise generated by the engagement of the roller 21 with the tooth of the sprocket 20 because the roller 21 rolls along the first curved surface 20A into the space between the teeth until the roller 21 is held between the working points T on the tooth flanks of the adjacent teeth and does not strike against the bottom surface of the tooth.

Although the tooth profile of the sprocket disclosed in JP-U No. 7-6554 is capable of reducing shocks exerted on the sprocket by the roller when the roller engages the tooth flank of a tooth of the sprocket and of reducing noise generated by the engagement of the roller with the tooth of the sprocket because the roller does not strike against the bottom surface of the tooth, the roller is unable to be disengaged smoothly from the teeth and enhances the vibration of the chain because the roller is held like a wedge between the tooth flanks converging toward the tooth bottom when the roller is in engagement with the teeth.

Accordingly, it is an object of the present invention to provide a tooth profile for a roller chain sprocket, capable of making the rollers of a chain come into engagement with the teeth of the roller chain sprocket without generating large noise, and making the rollers disengage smoothly from the teeth of the roller chain sprocket.

SUMMARY OF THE INVENTION

With the foregoing object in view, the present invention provides a tooth profile for a roller chain sprocket, comprising: a first section having a circular profile, extending along a path of movement of an outer circumference of a succeeding roller of a roller chain about a center of a preceding roller of the roller chain connected to the succeeding roller by link plates, and forming a portion of a clearance flank on the back side with respect to the engaging direction of the roller chain, from a first working point on the clearance flank where the succeeding roller engages a tooth to the tip of the tooth; a second section having a circular profile continuous with the first section, conforming to the outer circumference of the succeeding roller, and forming a portion of the clearance flank from the working point to the root of the tooth; and a third section forming a portion of a working flank of a tooth on the forward side with respect to the engaging direction of the roller chain from a second working point to the tip of the tooth, continuous with the second section and formed in a profile which does not interfering with a path of movement of the outer circumference of the succeeding roller.

When a succeeding roller of the chain connected by link plates to a preceding roller in engagement with a working flank of the sprocket comes into engagement with a clearance flank, the succeeding roller moves along a circular path of movement about the center of the preceding roller. The succeeding roller rolls smoothly along the first section having the circular profile to the second section having the circular profile, forming the bottom surface and conforming to the outer circumference of the roller. Since the roller moves along the circular curved surface, the roller does not strike hard against the clearance flank and does not generate a large noise when engaging with a tooth.

The roller of the roller chain is able to disengage smoothly from the working flank of the sprocket, to reduce the vibration of the roller chain resulting from the disengagement of the roller chain from the sprocket and to reduce noise caused by the vibration of the roller chain because the third section of the tooth profile forming a portion of the working flank on the forward side, extending from the second working point to the tip of the tooth and continuous with the second section having the profile conforming to the outer circumference of the roller is formed so as not to interfere with the path of movement of the outer circumference of the roller.

BRIEF DESCRIPTION OF THE DRAWING FIGURES

DESCRIPTION OF THE PREFERRED EMBODIMENT

Figure 1:
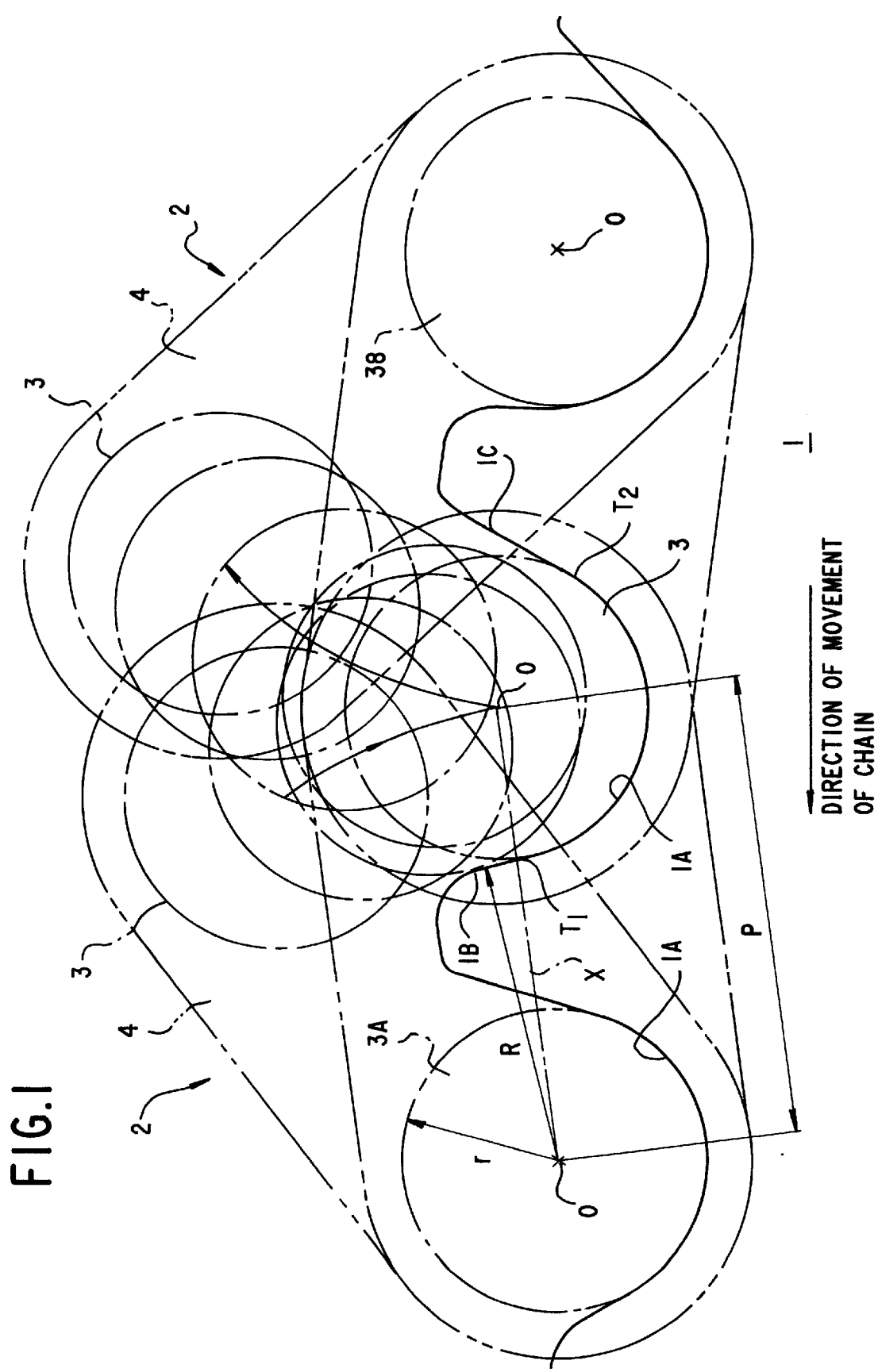
FIG. 1 is a diagrammatic view of a tooth profile for a roller chain sprocket, in a preferred embodiment according to the present invention.
Figure 2:
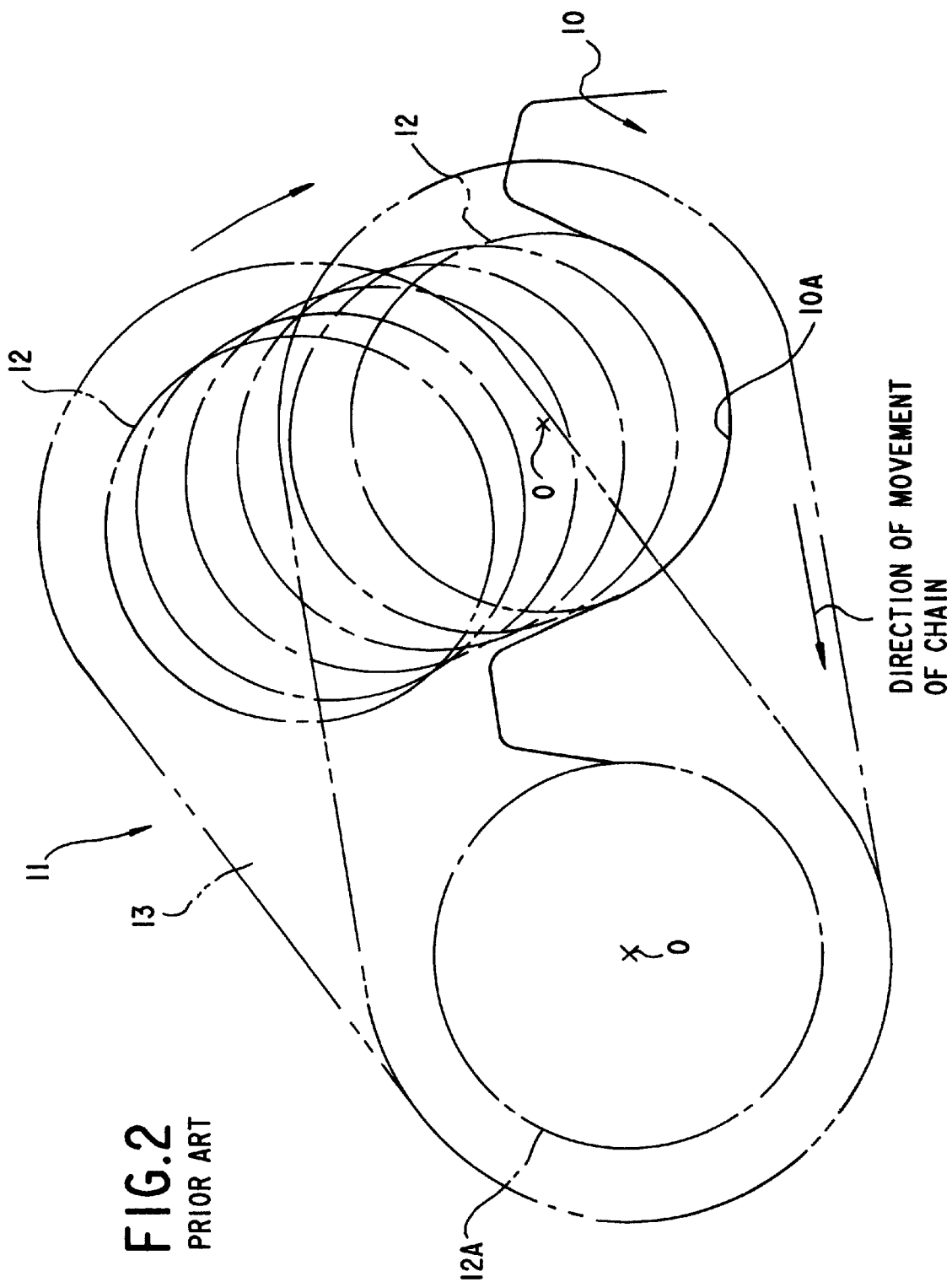
FIG. 2 is a diagrammatic view of a tooth profile for a roller chain sprocket, conforming to ISO standards.
Figure 3:
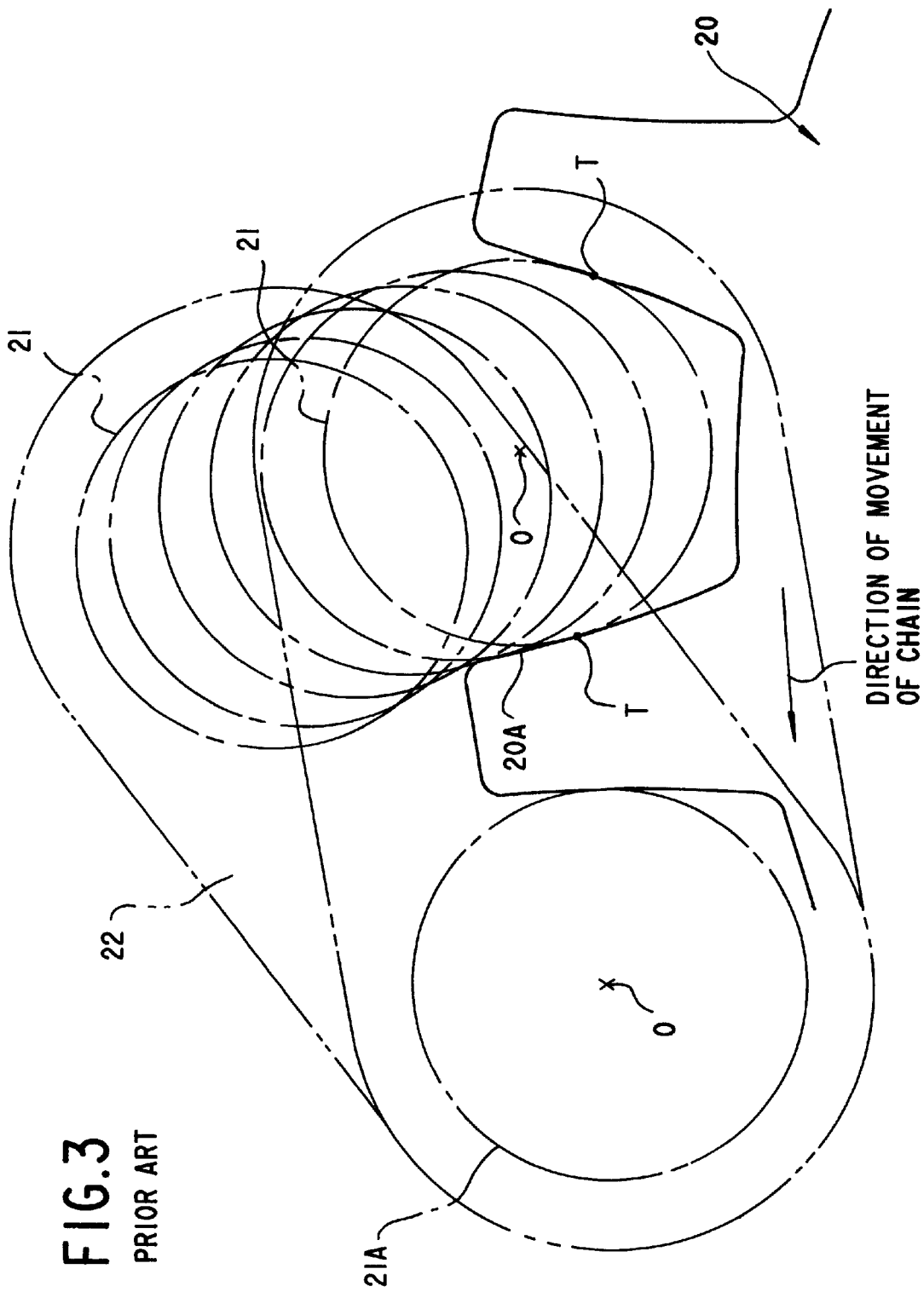
FIG. 3 is a diagrammatic view of a previously proposed improved tooth profile for a roller chain sprocket.

A tooth profile for a roller chain sprocket, in a preferred embodiment according to the present invention will be described with reference to the accompanying drawings. Referring to FIG. 1, a portion of a sprocket 1 is shown having teeth formed in the tooth profile in a preferred embodiment according to the present invention. A second section 1A of the tooth profile, between a first working point $T_1$ on a clearance flank on the back side with respect to the direction of movement of a chain 2 and a second working point $T_2$ on a working flank on the forward side with respect to the direction of movement of the chain 2, has a circular profile conforming to the outer circumference of a roller 3 of the chain 2.

A first section 1B of the tooth profile, between the first working point $T_1$ and the tip of the tooth, has a circular profile conforming to a path of movement of the outer circumference of a succeeding roller 3 connected by link plates 4 to a preceding roller 3A which has previously come into engagement with a working flank of the sprocket 1, having its center on the center O of the preceding roller 3A.

The first section is a circular curved surface of a radius R having its center at the center of the preceding roller 3A. The relation between the radius R of the first section 1B, the chordal pitch P, i.e., the center distance between the respective centers O of the preceding roller 3A and the succeeding roller 3, the radius r of the rollers 3 and 3A, and a clearance C is expressed by the equation: $R=P-r-C$. The value of the clearance C is determined by properly taking into consideration the dimensional accuracy of the tooth flank of the sprocket 1 and the rollers 3 of the chain 2, and the accuracy of the pitches of the rollers linked by link plates 4.

A third section 1C of the tooth profile, between the working point $T_2$ on the working flank on the forward side with respect to the direction of movement of the chain 2 and the tip of the tooth has a profile which will not interfere with a circular moving path along which the outer circumference of the roller 3 turns about the center of a succeeding roller 3B when disengaging from the sprocket 1. In this embodiment, the second section 1A having the circular profile, and the third section 1C between the second working point $T_2$ and the tip of the tooth are portions of a tooth profile specified in ISO standards.

The first working point $T_1$ is on a straight line interconnecting the centers O of the two adjacent rollers 3 and 3A in perfect engagement with the circular first sections 1A of the adjacent teeth of the sprocket 1, while the second working point $T_2$ is nearer to the center of the sprocket 1 than the first working point $T_1$ because the second section 1A having the circular profile, and the third section 1C, between the second working point $T_2$ and the tip of the tooth, are portions of a tooth profile specified in ISO standards.

When the chain 2 advances toward the sprocket 1 having teeth of the above-mentioned tooth profile and the succeeding roller 3 engages the clearance flank of the tooth of the sprocket 1, the succeeding roller 3 is pulled through the link plates 4 by the preceding roller 3A which has previously engaged the working flank of the teeth of the sprocket 1 and is turned toward the clearance flank of the tooth of the sprocket 1 about the center O of the preceding roller 3A as the sprocket 1 is rotated.

The roller 3 moves toward the clearance flank of the tooth of the sprocket 1 along a circular path having its center at the center of the preceding roller 3A, the roller 3 is guided smoothly by the first section 1B of a circular profile extending between the tip of the tooth and the first working point $T_1$ and comes into engagement with the second section 1A of a circular profile. Therefore, the roller 3 does not strike hard against the clearance flank and does not generate a large noise when engaging with the tooth.

When the chain 2 leaves the sprocket 1, the roller 3 moves away from the sprocket 1 along a circular path having its center at the center of the succeeding roller 3B. Since the third section 1C, extending from the second working point $T_2$ to the tip of the tooth is formed in the profile which will not interfere with the path of movement of the outer circumference of the roller 3, the roller 3 is able to separate easily from the second section 1A of the circular profile. Consequently, the vibration of the chain 2 will not be enhanced by the disengagement of the chain 2 from the sprocket 1.

Although the sections of the tooth profile in this embodiment, excluding the first section 1B between the tip of the tooth and the first working point $T_1$ on the clearance flank on the back side with respect to the direction of movement of the chain 2, conform to ISO standards, those sections may be formed in conformity to any standards, such as JIS standards, provided that at least the second section 1A, extending between the first working point $T_1$ and the bottom of the tooth and continuous with the first section 1B, has a circular profile conforming to the outer circumference of the roller 3, and the third section 1C, continuous with the second section 1A and extending from the second working point $T_2$ and the tip of the tooth, has a profile which will not interfere with the path of movement of the outer circumference of the roller 3.

As is apparent from the foregoing description, in the roller chain sprocket having teeth of the tooth profile of the present invention, the section of the tooth profile extending from the clearance flank on the back side with respect to the direction of movement of the chain from the tip of each tooth has a circular profile coinciding with the circular path of movement of the succeeding roller which is connected by the link plates to the preceding roller in engagement with the sprocket and is turned about the center of the preceding roller. Therefore, the succeeding roller is turned about the center of the preceding roller in engagement with the sprocket and is guided by the circular profile so as to come smoothly into engagement with the tooth, so that the roller will not strike hard against the tooth flank and will not generate a large noise.

The roller of the roller chain is able to disengage smoothly from the working flank of the sprocket, to reduce the vibration of the roller chain resulting from the disengagement of the roller chain from the sprocket and to reduce noise caused by the vibration of the roller chain because the third section of the tooth profile forming a portion of the working flank on the forward side, extending from the second working point to the tip of the tooth and continuous with the second section having the profile conforming to the outer circumference of the roller, is formed so as not to interfere with the path of movement of the outer circumference of the roller.

We claim:

1. A tooth profile for a roller chain sprocket, comprising:

a first section having a circular profile, extending along a path of movement of an outer circumference of a succeeding roller of a roller chain about a center of a preceding roller of said roller chain connected to said roller by link plates, and forming a portion of a working flank on a back side with respect to an engaging direction of said roller chain, from a first working point on a clearance flank where said succeeding roller engages a tooth to a tip of said tooth;

a second section having a circular profile, continuous with said first section, conforming to said outer circumference of said succeeding roller, and forming a portion of said clearance flank from said working point to a root of said tooth; and a third section forming a portion of a working flank of a tooth on a forward side with respect to said engaging direction of said roller chain from a second working point to said tip of said tooth, continuous with said second section and formed in a profile which does not interfere with said path of movement of said outer circumference of said succeeding roller, said profile of said third section being different in shape from said circular profile of said first section.

* * * * *